United States Patent
Choi et al.

(10) Patent No.: US 7,778,153 B2
(45) Date of Patent: Aug. 17, 2010

(54) METHOD FOR ESTIMATING TRANSMISSION DELAY AND RECEIVER USING THE SAME

(75) Inventors: Seungwon Choi, Seoul (KR); Seungheon Hyeon, Busan (KR); Jaehwan Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 103 days.

(21) Appl. No.: 12/306,918

(22) PCT Filed: Jun. 26, 2007

(86) PCT No.: PCT/KR2007/003092

§ 371 (c)(1),
(2), (4) Date: Dec. 29, 2008

(87) PCT Pub. No.: WO2008/002060

PCT Pub. Date: Jan. 3, 2008

(65) Prior Publication Data

US 2009/0290482 A1  Nov. 26, 2009

(30) Foreign Application Priority Data

Jun. 27, 2006  (KR) .................. 10-2006-0057818

(51) Int. Cl.
*H04J 11/00* (2006.01)
*H04W 4/00* (2009.01)

(52) U.S. Cl. .................. 370/210; 370/203; 370/329
(58) Field of Classification Search .................. 370/203, 370/208, 210, 211, 241, 252, 329, 330; 455/509
See application file for complete search history.

(56) References Cited

U.S. PATENT DOCUMENTS

| 7,336,647 B2 * | 2/2008 | Muharemovic et al. ...... 370/350 |
| 7,539,126 B2 * | 5/2009 | Geile et al. .................. 370/208 |
| 7,586,988 B2 * | 9/2009 | Koyanagi ...................... 375/260 |
| 7,701,841 B2 * | 4/2010 | Kawauchi et al. ............ 370/210 |
| 2007/0133460 A1 * | 6/2007 | Sohn et al. ................... 370/329 |
| 2009/0279420 A1 * | 11/2009 | Koyanagi ...................... 370/210 |

* cited by examiner

*Primary Examiner*—Chi H Pham
*Assistant Examiner*—Robert Lopata
(74) *Attorney, Agent, or Firm*—Lee, Hong, Degerman, Kang & Waimey

(57) ABSTRACT

There is provided a receiver for processing a ranging channel. The receiver includes a Fourier transformer for transforming a received signal into a frequency domain signal, a ranging channel extraction and ranging code elimination unit for extracting a ranging channel from the frequency domain signal, and eliminating a code of a ranging code from the ranging channel and a ranging channel processor for estimating transmission delay or transmission power from a time domain signal. By estimating transmission delay and/or transmission power in a time domain, it is possible to rapidly and accurately adjust the transmission delay and transmission power intensity in the ranging procedure.

9 Claims, 3 Drawing Sheets

[Fig. 1]
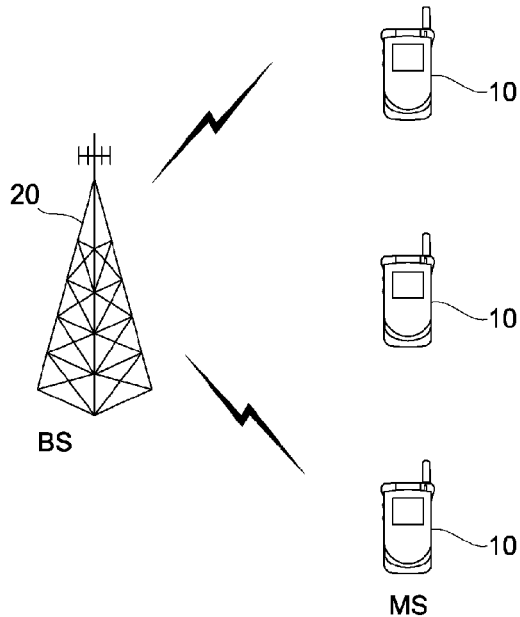
[Fig. 2]
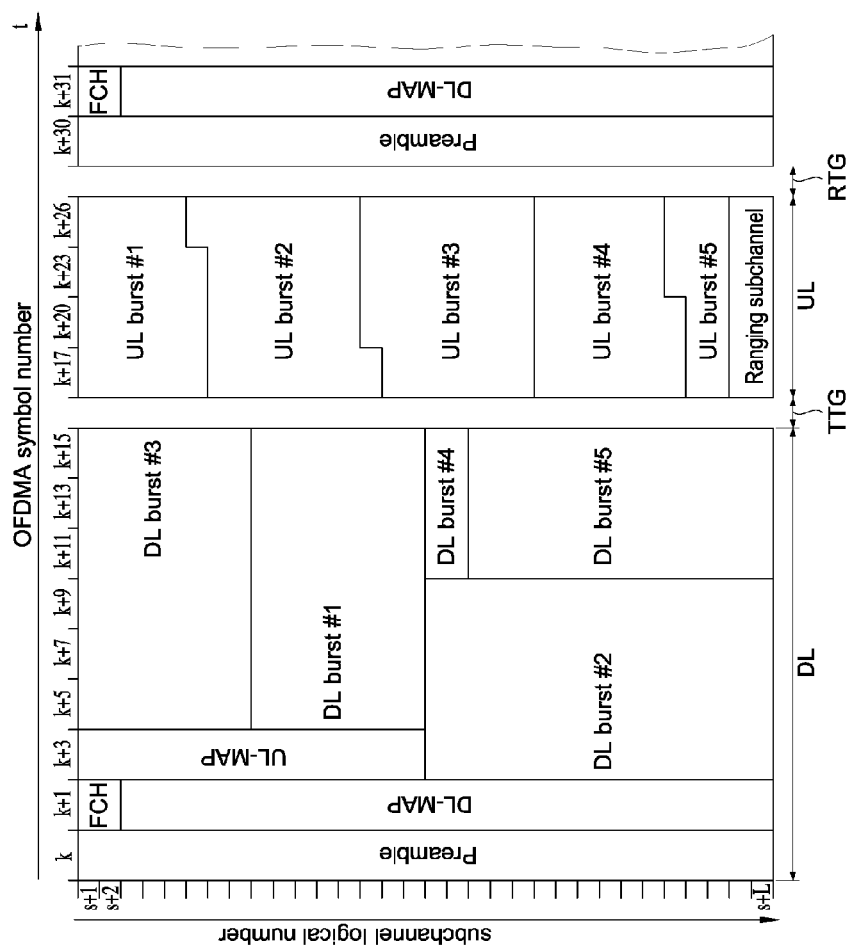

[Fig. 3]
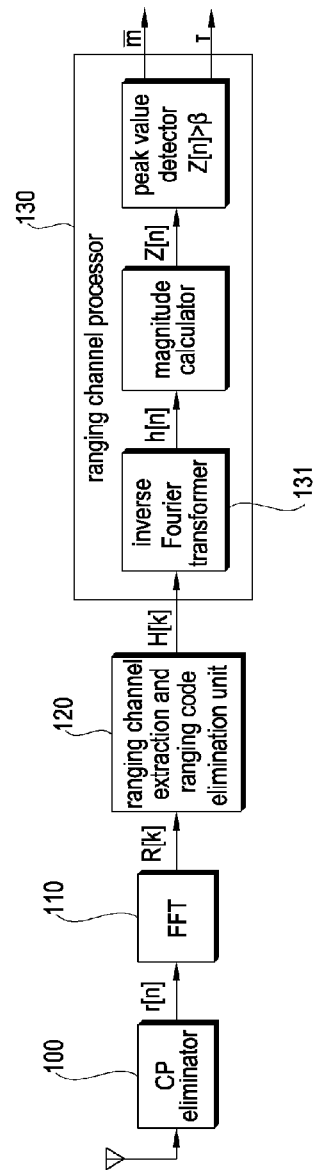
[Fig. 4]
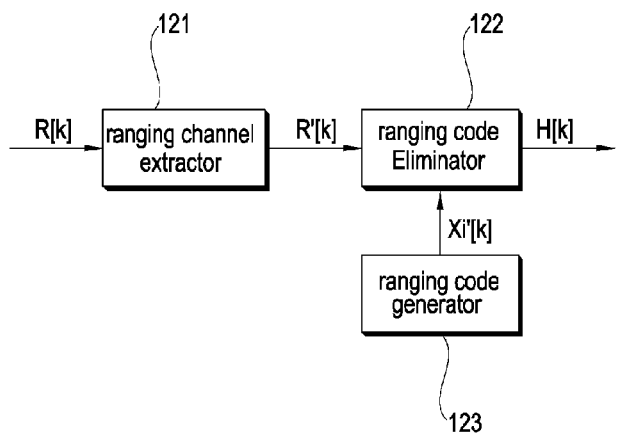

[Fig. 5]
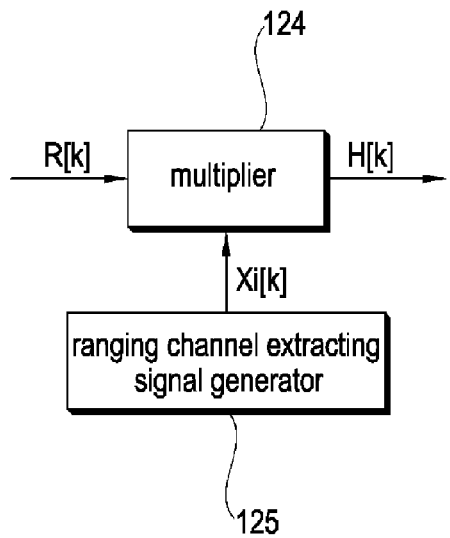
[Fig. 6]
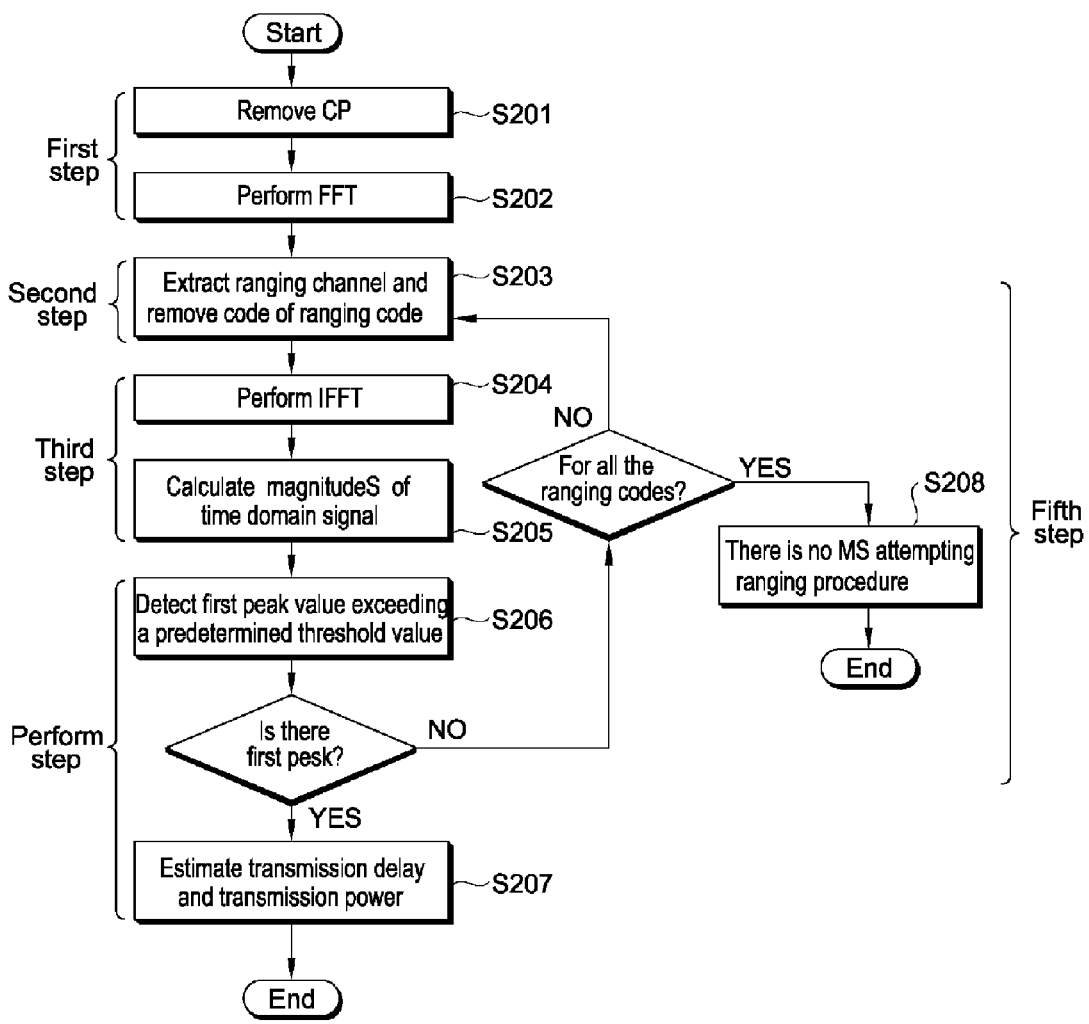

METHOD FOR ESTIMATING TRANSMISSION DELAY AND RECEIVER USING THE SAME

TECHNICAL FIELD

The present invention relates to wireless communication, and more particularly, to a method of allowing a base station to estimate the transmission delay of mobile stations through a ranging channel transmitted from the mobile stations.

BACKGROUND ART

Currently, a WiBro or WiMax system that is established or promoted as a domestic or foreign portable Internet standard is based on an orthogonal frequency division multiplexing (OFDM). The OFDM is a multi-carrier modulation scheme using a plurality of orthogonal subcarriers. An orthogonal frequency division multiple access (OFDMA) provides the multiplexing of multi-users by combing the OFDM with frequency division multiple access (FDMA) or time division multiple access (TDMA).

As used herein, the term "downlink" refers to the communication link from a base station to a mobile station, and the term "uplink" refers to the communication link from the mobile station to the base station.

In a wireless communication system based on the OFDMA, a base station provides services for a plurality of mobile stations. Uplink signals transmitted from the plurality of mobile stations can arrive at the base station, respectively, with different delay times and transmitting powers from each other. In this case, the uplink signals may not maintain orthogonality between subcarriers, which results in a severe signal loss.

One of methods for adjusting the time delay and transmitting power between a base station and a mobile station is to employ a ranging channel. A group of subcarriers is allocated to the ranging channel. The base station estimates a transmission delay and receiving power of the mobile station by using the ranging channel.

The ranging channel includes a ranging code. The ranging code is selected among predetermined set of pseudo-noise ranging codes.

A variety of methods are used in order for the base station to estimate the transmission delay of the mobile station using the ranging channel. The base station transforms a radio frequency (RF) signal transmitted from the mobile station into a baseband signal. The base station transforms the baseband signal into a frequency domain signal through a Fast Fourier Transform (FFT). The base station extracts the ranging channel from the frequency domain signal. Then, the base station multiplies the ranging channel by a phase rotation component ($e^{-j2\pi k\tau/N}$) generated by an arbitrary time delay ($\tau$) to eliminate the phase component of the ranging channel due to time delay. The base station estimates the transmission delay using correlation between the ranging channel removed of the phase component and the predefined set of ranging codes.

The ranging code included in the ranging channel must be multiplied by the phase rotation component one by one, which requires a large quantity of calculations. For example, if an arbitrary time delay it is wished to observe is a P sample interval and a group of ranging codes is composed of S codes, it is required that the ranging code should be subjected to a phase rotation component eliminating process P times and correlation should be obtained S times. In addition, the generation of the phase rotation component from the baseband signals contributes to an increase in the quantity of calculation of hardware.

Therefore, there is a need for a method of allowing the base station to efficiently and rapidly estimate a transmission delay and a transmission power of the mobile station by using the ranging channel.

DISCLOSURE OF INVENTION

Technical Problem

It is an object of the present invention to provide a method of estimating transmission delay of a mobile station using a time domain signal in which a frequency domain signal that has undergone a Fast Fourier Transform (FFT) is transformed into the time domain signal.

Technical Solution

In one aspect, there is provided a receiver for processing a ranging channel to estimate the transmission delay of a received signal. The receiver includes a Fourier transformer for transforming the received signal into a frequency domain signal, a ranging channel extraction and ranging code elimination unit for extracting a ranging channel including a ranging code from the frequency domain signal, and eliminating a code of the ranging code from the ranging channel and a ranging channel processor for converting the ranging channel removed of the code of the ranging code into a time domain signal so as to estimate transmission delay or transmission power from the time domain signal.

In another aspect, there is provided a method of estimating the transmission delay of a received signal. The method includes transforming the received signal into a frequency domain signal, extracting a ranging channel including a ranging code from the frequency domain signal, eliminating a code of the ranging code from the ranging channel, transforming the ranging code removed of the code of the ranging code into a time domain signal and estimating the transmission delay of the ranging channel from the time domain signal.

Advantageous Effects

By estimating transmission delay and/or transmission power in a time domain, it is possible to rapidly and accurately adjust the transmission delay and transmission power intensity in the ranging procedure.

BRIEF DESCRIPTION OF THE DRAWINGS

FIG. 1 is a schematic diagram illustrating a wireless communication system.

FIG. 2 is a schematic diagram illustrating an example of a frame structure.

FIG. 3 is a block diagram illustrating a receiver according to one embodiment of the present invention.

FIG. 4 is a block diagram illustrating a ranging channel extraction and ranging code elimination unit according to one embodiment of the present invention.

FIG. 5 is a block diagram illustrating a ranging channel extraction and ranging code elimination unit according to another embodiment of the present invention.

FIG. 6 is a flow chart showing a method of processing a ranging channel according to an embodiment of the present invention.

MODE FOR THE INVENTION

FIG. 1 is a schematic diagram illustrating a wireless communication system. The wireless communication system is widely deployed to provide various communication services such as voice, packet data, etc.

Referring to FIG. 1, the wireless communication system includes a mobile station (MS) 10 and a base station (BS) 20. The MS 10 may have immobility or mobility and may be called other names such as user equipment (UE), user terminal (UT), subscriber station (SS), wireless device or the like. The BS 20 may be called node B, base transceiver system (BTS), access point or the like. One or more cells can exist in the BS 20.

The wireless communication system may be based on an orthogonal frequency division multiplexing (OFDM)/orthogonal frequency division multiple access (OFDMA). The OFDM employs a plurality of orthogonal subcarriers. The OFDM uses orthogonality property between inverse fast Fourier Transform (IFFT) and fast Fourier Transform (FFT). A transmitter transmits data after performing IFFT on the data. A receiver performs FFT on a received signal to reproduce the data. The transmitter uses IFFT to combine multiple subcarriers and the receiver uses FFT corresponding to the IFFT to divide the multiple subcarriers.

Hereinafter, a slot represents the smallest radio resource allocation unit, and the slot is defined by a time and a subchannel. In the uplink transmission, the subchannel includes a plurality of tiles. The subchannel may include six tiles. In the uplink transmission, a burst can include three OFDM symbols and one subchannel. In partial usage of subchannels (PUSC) permutation, a tile may include four contiguous subcarriers over three OFDM symbols. Optionally, the tile may include three contiguous subcarriers over three OFDM symbols. A bin may include nine contiguous subcarriers over an OFDM symbol. A band refers to a group of four rows of the bin, and an adaptive modulation and coding (AMC) subchannel is constructed of six contiguous bins in the same band.

FIG. 2 is a schematic diagram illustrating an example of a frame structure. A frame is a data sequence during a fixed time period used by a physical specification.

Referring to FIG. 2, the frame includes a downlink frame and an uplink frame. Time division duplex (TDD) is a scheme in which the uplink and downlink transmission are separated in time but share same frequency. The downlink frame temporally precedes the uplink frame. The downlink frame starts in the order of Preamble, Frame Control Header (FCH), Downlink (DL)-MAP, Uplink (UL)-MAP and burst region. A guard time for separating the downlink frame and the uplink frame from each other is inserted at both an intermediate portion of the frame (between the downlink frame and the uplink frame) and a last portion of the frame (following the uplink frame). A transmit/receive transition gap (TTG) is a gap defined between a downlink burst and a subsequent uplink burst. A receive/transmit transition gap (RTG) is a gap defined between an uplink burst and a subsequent downlink burst.

The preamble is used for initial synchronization, cell search, frequency offset and channel estimation between the BS and the MS. The FCH includes information regarding the length of the DL-MAP and the coding scheme of the DL-MAP.

The DL-MAP is a region where the DL-MAP message is transmitted. The DL-MAP message defines the access of a downlink channel. The DL-MAP message includes a configuration change count of a Downlink Channel Descriptor (DCD) and a BS identifier (ID). The DCD describes a downlink burst profile applied to a current frame. The downlink burst profile refers to the property of a downlink physical channel, and the DCD is periodically transmitted through the DCD message.

The UL-MAP is a region where the UL-MAP message is transmitted. The UL-MAP message defines the access of a uplink channel. The UL-MAP message includes a configuration change count of a Uplink Channel Descriptor (UCD), and an effective start time of the uplink allocation defined by the UL-MAP. The UCD describes an uplink burst profile. The uplink burst profile refers to the property of an uplink physical channel, and the UCD is periodically transmitted through the UCD message. The UCD message includes information regarding a backoff window for performing ranging procedure.

The uplink frame includes a ranging subchannel used by a ranging channel. The ranging channel including ranging codes during the initial ranging or the periodic ranging is transmitted from the MS to the BS.

FIG. 3 is a block diagram illustrating a receiver according to one embodiment of the present invention. The receiver may be a part of a BS.

Referring to FIG. 3, the receiver comprises a CP eliminator 100, a Fourier transformer 110, a ranging channel extraction and ranging code elimination unit 120 and a ranging channel processor 130.

The CP eliminator 100 eliminates a cyclic prefix (CP) included in a received signal. The Fourier transformer 110 performs fast Fourier transform (FFT) on the received signal removed of the CP and transforms the received signal into a frequency domain signal.

The ranging channel extraction and ranging code elimination unit 120 extracts a ranging channel from the frequency domain signal, and eliminates a code of ranging code from the ranging channel. The ranging channel extraction and ranging code elimination unit 120 receives the frequency domain signal R[k] from the Fourier transformer 110. The frequency domain signal R[k] contains a data channel, a ranging channel and a control channel. Hence the ranging channel extraction and ranging code elimination unit 120 firstly extracts the ranging channel from the frequency domain signal. The ranging channel contains the ranging code selected by the MS. The ranging code is typically modulated by binary phase shift keying (BPSK) to thereby have a code of '+1' or '−1'.

Linear phase rotation property and interpolation by transmission delay are used to accurately estimate a transmission delay and transmission power of the ranging channel. The ranging channel extraction and ranging code elimination unit 120 eliminates the code of the ranging code contained in the ranging channel to obviate phase inversion effect to thereby generate a ranging channel preprocessing signal H[k]. One portion of the ranging channel preprocessing signal H[k] contains a ranging code removed of the code of the ranging code and a remaining portion of the ranging channel preprocessing signal H[k] includes a null value for interpolation.

FIG. 4 is a block diagram illustrating a ranging channel extraction and ranging code elimination unit according to one embodiment of the present invention. The ranging channel extraction and ranging code elimination unit employs a method of extracting a ranging channel from a frequency domain signal R[k], and eliminating a code of a ranging code from the ranging channel.

Referring to FIG. 4, a ranging channel extractor 121 receives a frequency domain signal R[k] from a Fourier transformer 110 to output a ranging channel extracting signal R'[k]. The ranging channel extractor 121 inserts a null value at the remaining portion except a portion of the ranging channel in the frequency domain signal. The ranging channel extracting signal R'[k] is a signal in which a null value is inserted at all the remaining portions except a ranging channel. The ranging channel extractor 121 functions to insert a null value at other channels (including data channel, control channel, etc.) other than the ranging channel for interpolation.

A ranging code eliminator 122 functions to multiply the ranging channel of the ranging channel extracting signal R'[k] by a reference ranging code generated from a ranging code generator 123 to thereby eliminate a code of a ranging code contained in the ranging channel. The reference ranging code may be selected from a predetermined pseudo-noise code group.

FIG. 5 is a block diagram illustrating a ranging channel extraction and ranging code elimination unit according to another embodiment of the present invention. The ranging channel extraction and ranging code elimination unit employs a configuration of generating a ranging channel extracting signal Xi[k] and multiplying the ranging channel extracting signal Xi[k] by a frequency domain signal R[k], and simultaneously performs both extraction of a ranging channel and elimination a code of a ranging code.

Referring to FIG. 5, the ranging channel extracting signal generator 125 generates a ranging channel extracting signal Xi[k]. The ranging channel extracting signal Xi[k] is identical in length to a frequency domain signal R[k], and is a signal in which a ranging code is inserted at a portion corresponding to a ranging channel in the frequency domain signal R[k] and a null value is inserted at the remaining portions except the portion of the ranging channel.

A multiplier 124 multiplies the frequency domain signal R[k] by the ranging channel extracting signal Xi[k] to thereby produce a ranging channel preprocessing signal H[k].

Referring back to FIG. 3, the ranging channel processor 130 converts the ranging channel removed of the code of the ranging code into a time domain signal so as to estimate the transmission delay and/or transmission power through the time domain signal. The ranging channel processor 130 calculates magnitudes of the time domain signal, and then estimates the transmission delay and power intensity of the ranging channel using the first peak value among the magnitudes of time domain signal whose values exceed a predetermined threshold value.

The ranging channel processor 130 includes an inverse Fourier transformer 131, a magnitude calculator 132 and a peak value detector 133. The inverse Fourier transformer 131 converts the the ranging channel removed of the code of the ranging code to the time domain signal. The magnitude calculator 132 calculates the magnitudes of the time domain signal. The peak value detector 133 estimates the transmission delay and transmission power of the ranging channel sing the first peak value among the magnitudes of the time domain signal whose values exceed a predetermined threshold value.

The ranging code in the ranging channel preprocessing signal H[k] rotates in phase in proportion to transmission delay and a frequency of a subcarrier. Thus, the time domain signal h[n] as a result of performing the inverse Fourier transformation on the ranging channel preprocessing signal H[k] becomes a sinc function having a peak value at a transmission delay time. In case where a multi-path exists between a BS and a MS, the time domain signal h[n] appears in a sum of sinc functions each having a peak value at a transmission delay time. Each peak value is in proportion to a channel gain of each path.

In order to smoothly demodulate a data channel, a start point of the Fourier transformation is required to be set based on a signal received through the first path among received signals passing through the multi-path. In case of using the maximum peak value, it is possible to estimate a start point following the second path but not the first path as the transmission delay time. In this manner, if the start point following the second path is estimated as the transmission delay time so as to be set as a standard of the start point of the Fourier transformation, a received signal prior to the second path causes inter-symbol interference (ISI), thereby resulting in severe performance degradation of the receiver.

Therefore, the peak value detector 133 estimates the transmission delay of the ranging channel using a sample number of the first peak value of the time domain signal h[n]. Also, the peak value detector 133 finds a sum of respective peak values by a multi-path in the magnitude of the time domain signal h[n] to thereby estimate the receiving power of each mobile station.

Accordingly, the ranging channel processor 130 employs the first peak value in the magnitude Z[n] of the time domain signal h[n] for estimation of the transmission delay of the ranging channel signal. A transmission delay estimation value $$\overline{m}$$

as one output of the ranging channel processor 130 can use a sample number of the first peak value in the magnitude Z[n] of the time domain signal h[n]. In addition, a receiving power estimation value $$\overline{\tau}$$

as the other output of the ranging channel processor 130 can be found through a sum of respective peak values by the multi-path in the magnitude Z[n] of the time domain signal h[n].

FIG. 6 is a flow chart showing a method of processing a ranging channel according to an embodiment of the present invention.

Referring to FIG. 6, a method of processing a ranging channel comprises a first step of eliminating a cyclic prefix (CP) contained in a received signal (S201) and then performing Fourier transformation on the received signal (S202) to cause the received signal to be converted into a frequency domain signal, a second step of extracting a ranging channel from the frequency domain signal and eliminating a code of a ranging code from the ranging channel (S203), a third step of performing inverse Fourier transformation on the ranging channel removed of the code of the ranging code so as to be transformed into a time domain signal (S204) and detecting an envelope of the time domain signal (S205), a fourth step of calculating magnitudes of the time domain signal to detect the first peak value in the magnitudes of the time domain signal exceeding a predetermined threshold value (S206) and estimating transmission delay and transmission power of the ranging channel (S207), and a fifth step of, if the first peak value is not detected, changing the ranging code to repeatedly perform the step S203 to the following steps.

The first step is performed by the CP eliminator 100 and the Fourier transformer 110 shown in FIG. 3 so as to eliminate a cyclic prefix (CP) contained in the received signal and then to transform the received signal into the frequency domain signal.

The second step is performed by ranging channel extraction and ranging code elimination unit 120 of FIG. 3 so as to extract a ranging channel from the frequency domain signal and eliminate the code of the ranging code from the ranging channel.

The third step is performed by the inverse Fourier transformer 131 and the magnitude calculator 132 in the ranging channel processor 130 so as to perform inverse Fourier transformation on the ranging channel removed of the code of the ranging code so as to be transformed into the time domain signal and calculate the magnitudes of the time domain signal. An envelope detector can be used as a device for calculating the magnitudes of the time domain signal.

The fourth step is performed by the peak value detector 133 in the ranging channel processor 130 so as to calculate the magnitudes of the time domain signal to detect the first peak value in the magnitudes of the time domain signal exceeding the predetermined threshold value (S206) and estimate the transmission delay and transmission power of the ranging channel.

If the first peak value is not detected through the first to fourth steps, the ranging code is changed to repeatedly perform the step S203 to the following steps.

The peak value detector 133 cannot detect the first peak value when the ranging channel extraction and ranging code elimination unit 120 eliminates the code of the ranging code using a ranging code different from the ranging code of the received signal. So, a BS can easily identify a MS which transmits the ranging channel. In this case, it is determined that there is no transmission of any identical ranging code to the ranging code generated from the ranging channel extraction and ranging code elimination unit 120, and the ranging channel extraction and ranging code elimination unit 120 generates another ranging code to eliminate a code of the other ranging code.

This process is continuously performed until the first peak value exceeding the predetermined threshold value is detected. In case where the first peak value exceeding the predetermined threshold value is not detected for all the ranging codes that can be generated from the receiver, it is determined that no MS attempts a ranging procedure.

The steps of a method described in connection with the embodiments disclosed herein may be implemented by hardware, software or a combination thereof. The hardware may be implemented by an application specific integrated circuit (ASIC) that is designed to perform the above function, a digital signal processing (DSP), a programmable logic device (PLD), a field programmable gate array (FPGA), a processor, a controller, a microprocessor, the other electronic unit, or a combination thereof. A module for performing the above function may implement the software. The software may be stored in a memory unit and executed by a processor. The memory unit or the processor may employ a variety of means that is well known to those skilled in the art.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims. Therefore, all changes and modifications that fall within the metes and bounds of the claims, or equivalence of such metes and bounds are intended to be embraced by the appended claims.

The invention claimed is:

1. A receiver for processing a ranging channel to estimate the transmission delay of a received signal, the receiver comprising:
    a Fourier transformer for transforming the received signal into a frequency domain signal;
    a ranging channel extraction and ranging code elimination unit for extracting a ranging channel including a ranging code from the frequency domain signal, and eliminating a code of the ranging code from the ranging channel; and
    a ranging channel processor for converting the ranging channel removed of the code of the ranging code into a time domain signal so as to estimate transmission delay or transmission power from the time domain signal.

2. The receiver according to claim 1, wherein ranging channel extraction and ranging code elimination unit comprises:
    a ranging channel extractor for extracting the ranging channel from the frequency domain signal;
    a ranging code generator for generating a reference ranging code; and
    a ranging code eliminator for multiplying a ranging code included in the ranging channel by the reference ranging code to thereby eliminate the code of the ranging code.

3. The receiver according to claim 2, wherein the ranging channel extractor inserts a null value at the remaining portion except a portion of the ranging channel in the frequency domain signal.

4. The receiver according to claim 1, wherein ranging channel extraction and ranging code elimination unit comprises:
    a ranging channel extracting signal generator for generating a ranging channel extracting signal; and
    a multiplier for multiplying the frequency domain signal by the ranging channel extracting signal to thereby extract the ranging channel from the frequency domain signal and eliminate the code of the ranging code,
    wherein the ranging channel extracting signal is identical in length to the frequency domain signal and is a signal in which a ranging code is inserted at a portion corresponding to the ranging channel in the frequency domain signal and a null value is inserted at the remaining portion except a portion of the ranging channel.

5. The receiver according to claim 1, wherein the ranging channel processor comprises:
    an inverse Fourier transformer for converting the ranging channel removed of the code of the ranging code into the time domain signal;
    a magnitude calculator for calculating magnitudes of the time domain signal; and
    a peak value detector for estimating the transmission delay of the ranging channel using the first peak value among the magnitudes of the time domain signal whose values exceed a predetermined threshold value.

6. The receiver according to claim 5, wherein the magnitude calculator is an envelope detector.

7. The receiver according to claim 1, wherein the ranging channel processor finds a sum of respective peak values by a multi-path in magnitudes of the time domain signal to thereby estimate the transmission power.

8. A method of estimating the transmission delay of a received signal, the method comprising:
    transforming the received signal into a frequency domain signal;
    extracting a ranging channel including a ranging code from the frequency domain signal;
    eliminating a code of the ranging code from the ranging channel;
    transforming the ranging code removed of the code of the ranging code into a time domain signal; and
    estimating the transmission delay of the ranging channel from the time domain signal.

9. The method according to claim 8, wherein estimating the transmission delay comprises:
    calculating magnitudes of the time domain signal; and
    estimating transmission delay of the ranging channel using the first peak value exceeding a predetermined threshold value from the magnitudes of the time domain signal.

* * * * *